Oct. 29, 1935.  L. Y. SPEAR ET AL  2,019,026
ELECTRIC DRIVE
Original Filed Oct. 22, 1932  7 Sheets-Sheet 1
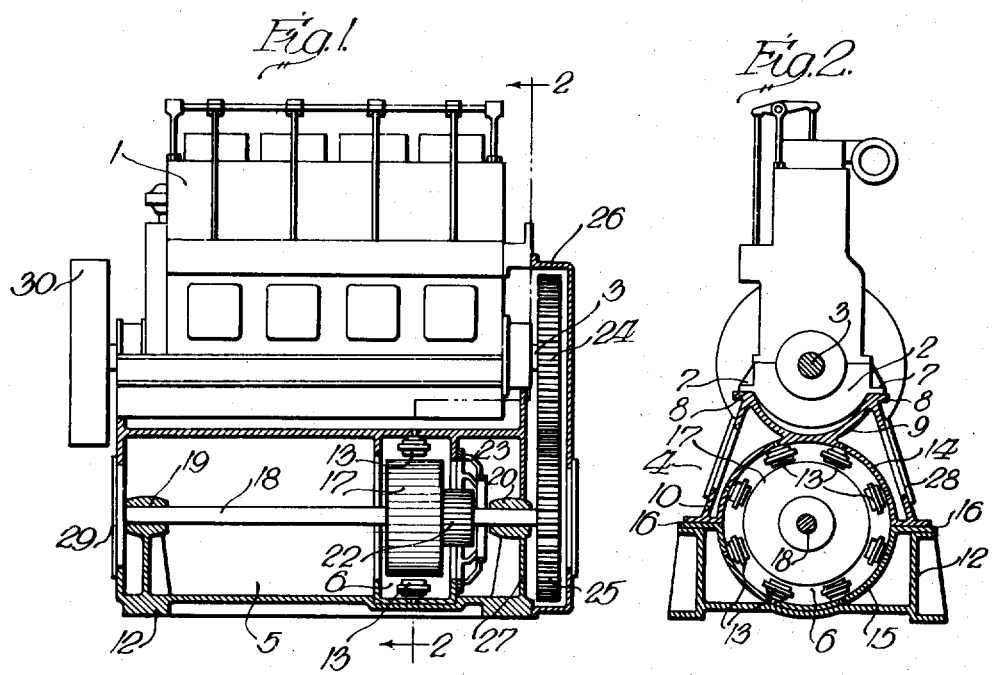
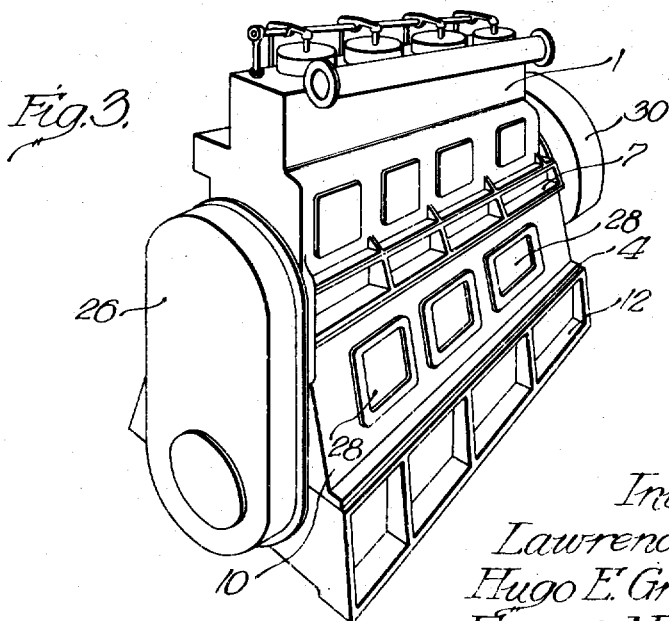
Inventors:
Lawrence Y. Spear
Hugo E. Grieshaber
Ernest Nibbs Oct. 29, 1935.    L. Y. SPEAR ET AL    2,019,026
ELECTRIC DRIVE
Original Filed Oct. 22, 1932    7 Sheets-Sheet 2
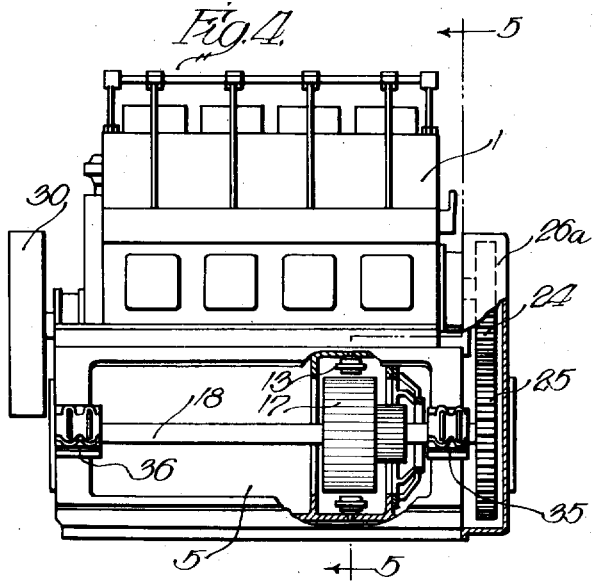
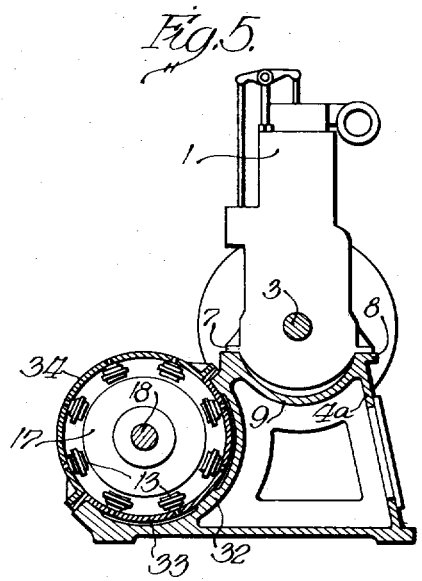
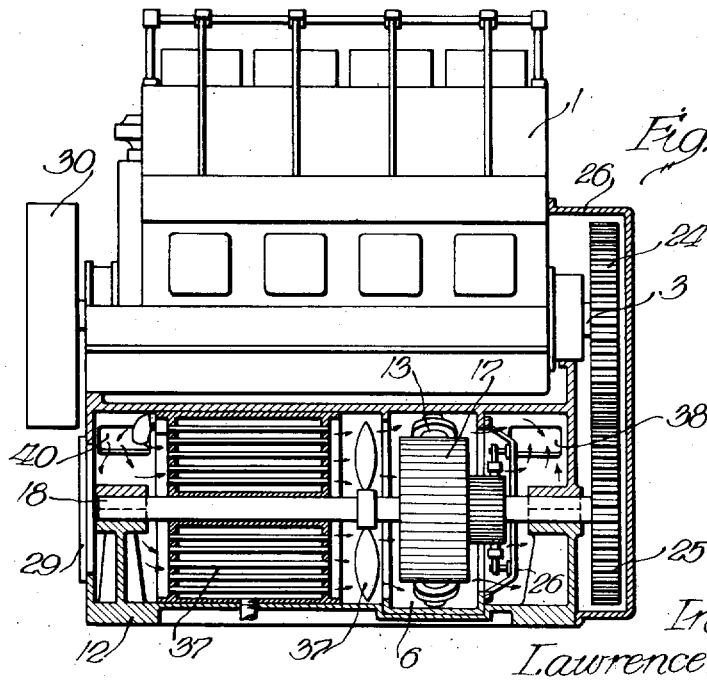

Oct. 29, 1935.  L. Y. SPEAR ET AL  2,019,026

ELECTRIC DRIVE

Original Filed Oct. 22, 1932  7 Sheets-Sheet 3

Inventors:
Lawrence Y. Spear
Hugo E. Grieshaber
Ernest Nibbs
By Brown Jackson Boettcher Dienner
Att'ys.

Oct. 29, 1935. L. Y. SPEAR ET AL 2,019,026
ELECTRIC DRIVE
Original Filed Oct. 22, 1932   7 Sheets-Sheet 4
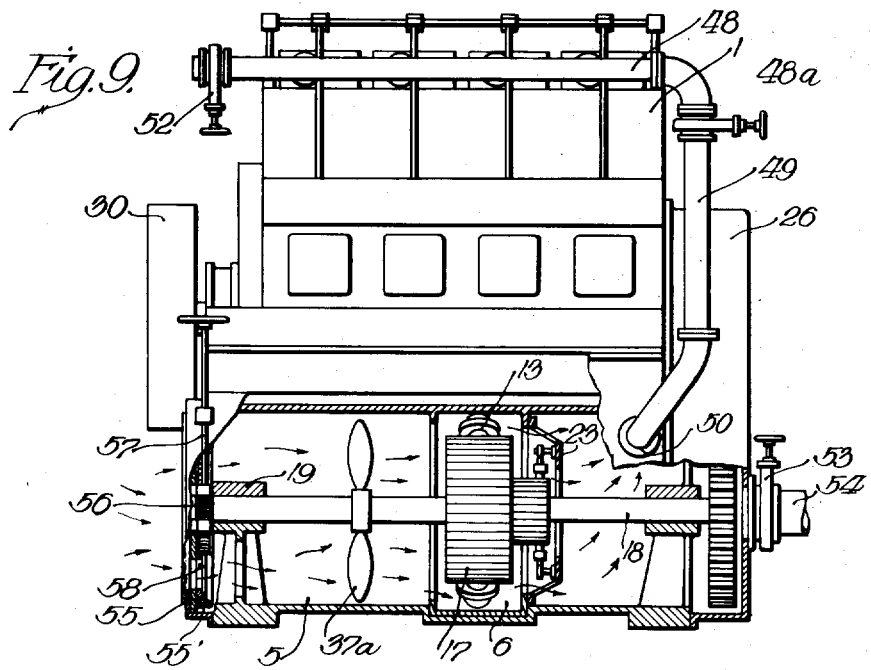
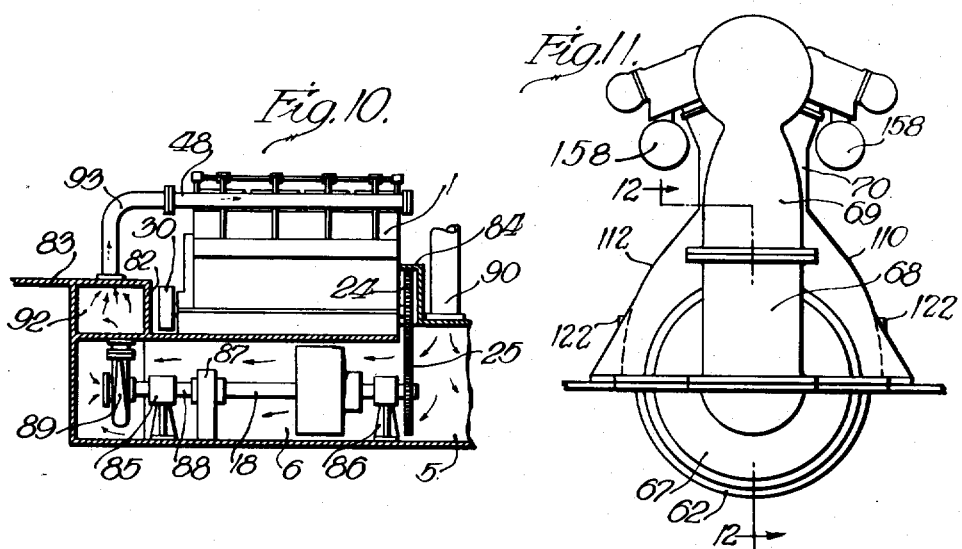
Inventors:
Lawrence Y. Spear
Hugo E. Grieshaber
Ernest Nibbs

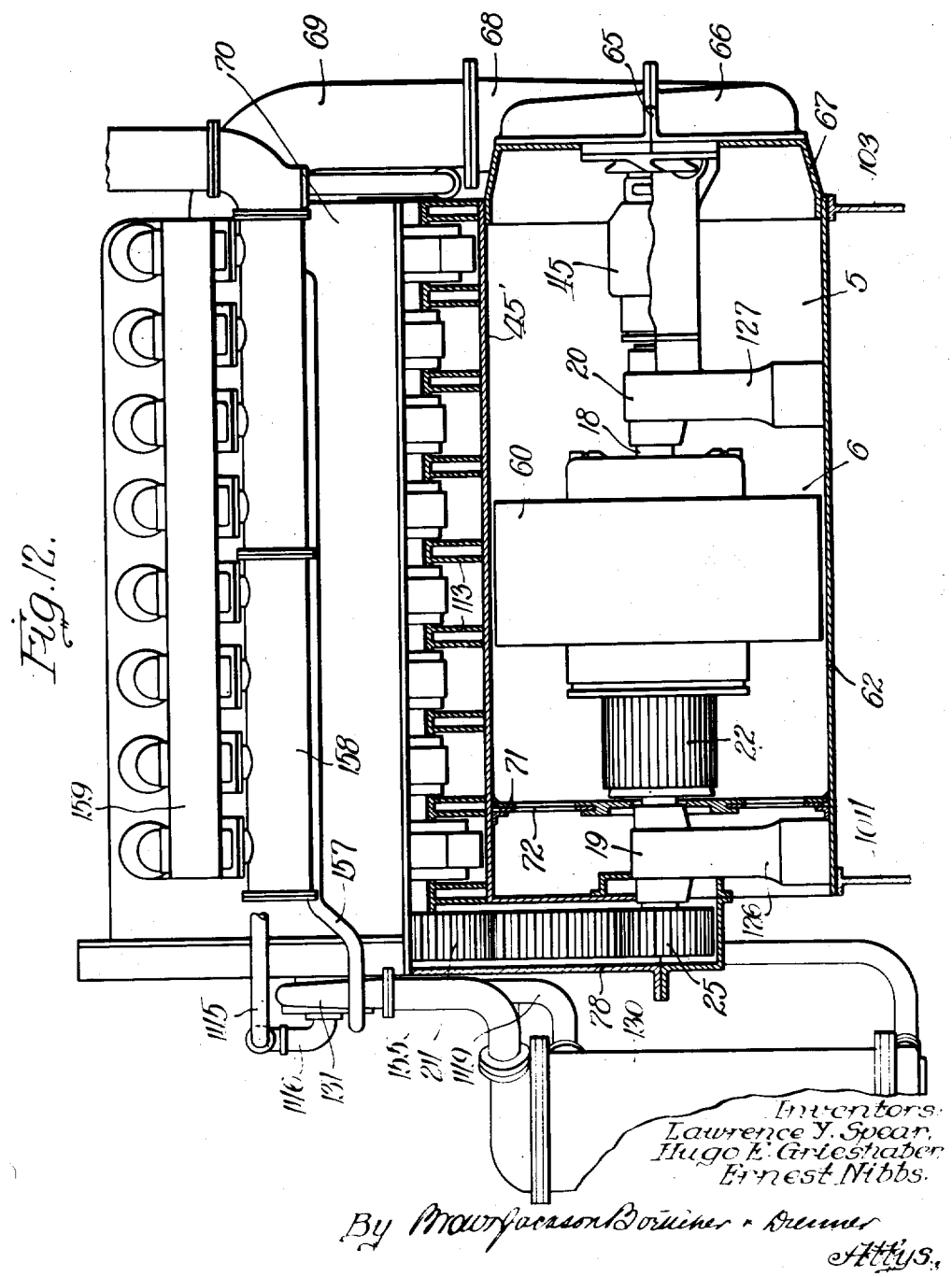

Oct. 29, 1935.      L. Y. SPEAR ET AL      2,019,026
ELECTRIC DRIVE
Original Filed Oct. 22, 1932      7 Sheets-Sheet 6
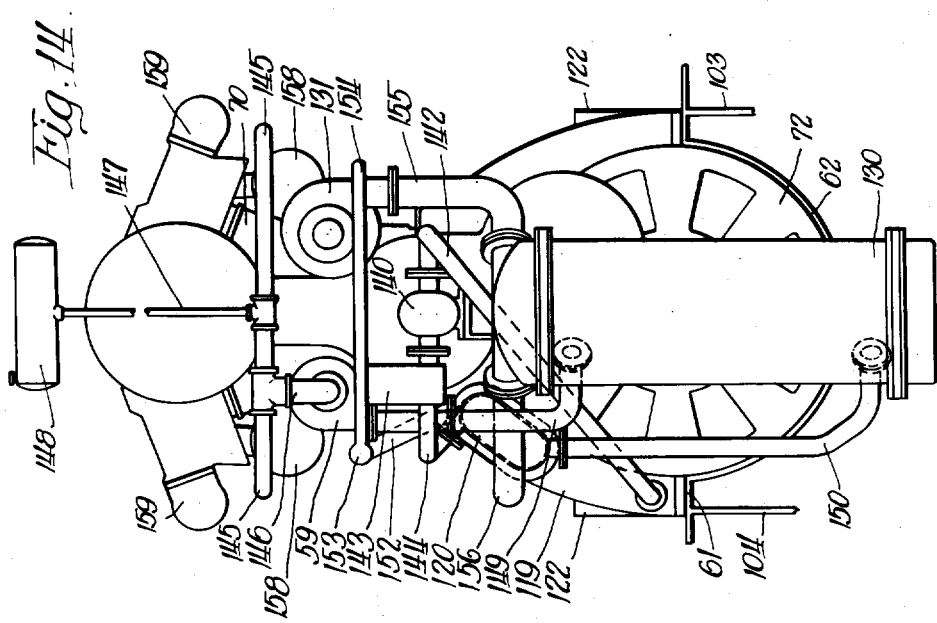
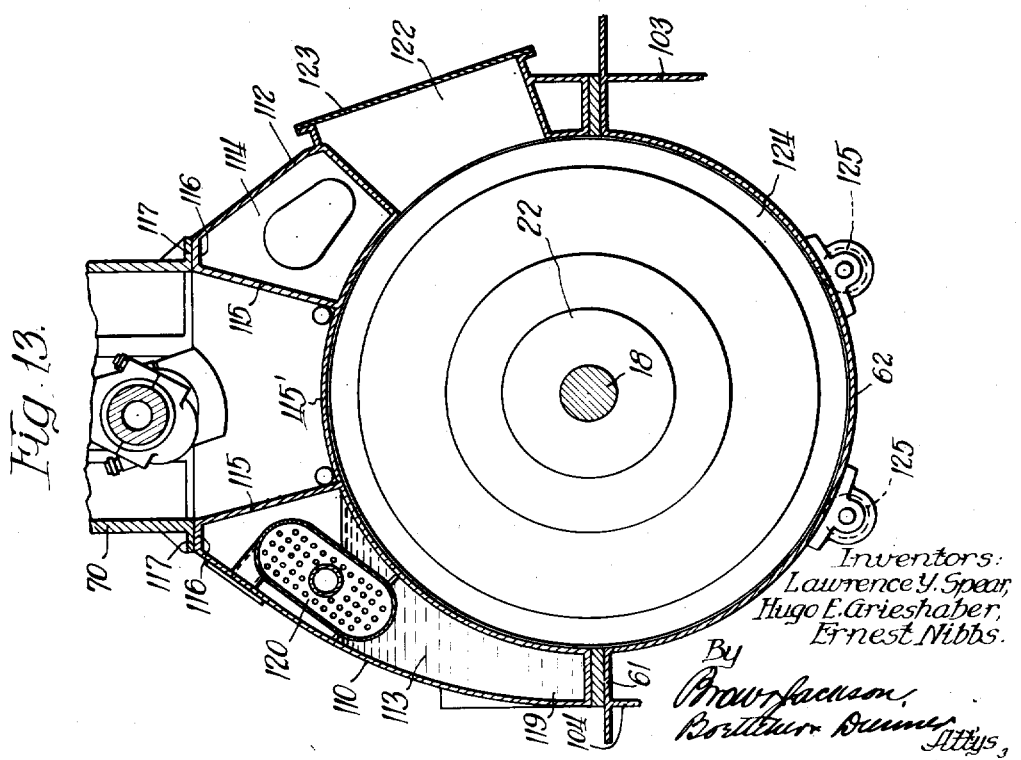
Inventors:
Lawrence Y. Spear,
Hugo E. Grieshaber,
Ernest Nibbs.
By
Attys.

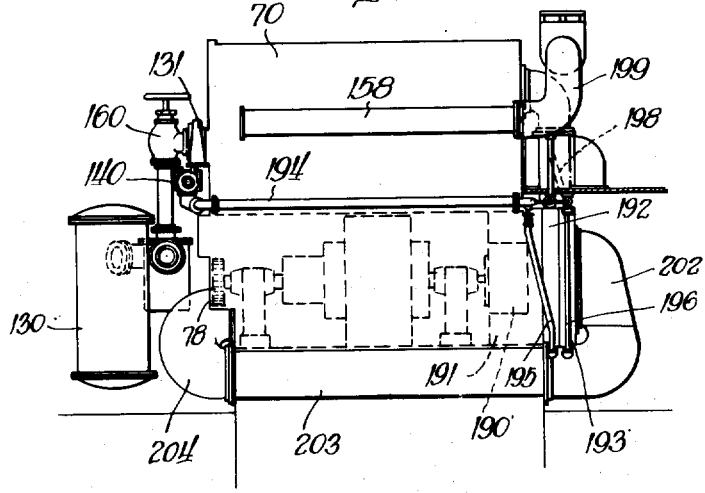
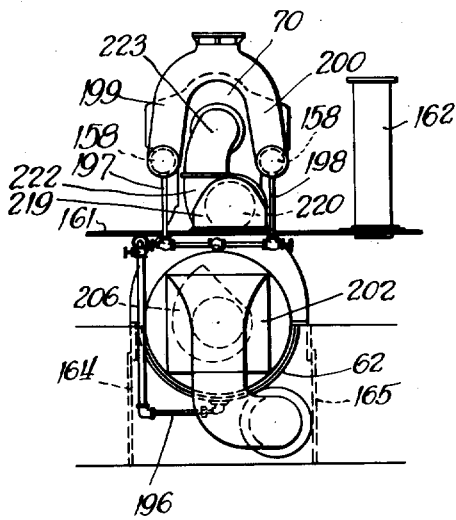
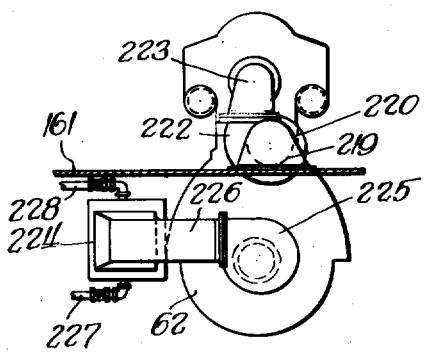

Patented Oct. 29, 1935

2,019,026

UNITED STATES PATENT OFFICE 2,019,026

ELECTRIC DRIVE

Lawrence Y. Spear, Hugo E. Grieshaber, and Ernest Nibbs, New London, Conn., assignors to Electric Boat Company, Groton, Conn., a corporation of New Jersey Original application October 22, 1932, Serial No. 639,120. Divided and this application March 19, 1934, Serial No. 716,288

29 Claims. (Cl. 290—1)

Our invention is adapted not only to the propulsion of marine and other vehicles but also to other situations where the use of a compact, light-weight electric generating set of minimum length is desirable or necessary. While the specific forms of the invention herein disclosed are particularly applicable to the electrical surface propulsion of submarines, we wish it understood that the invention is not to be considered as limited to that specific use, but is applicable to other uses or situations.

The present invention is a division of our copending application, Serial No. 639,120, filed October 22, 1932, and is directed particularly to a combination of an internal combustion engine and an electric generator as a power unit for submarines and other purposes.

In submarine propulsion, different conditions of operation are involved by surface and under-surface propulsion. The power units for surface propulsion are heat engines usually of the internal combustion type. For submerged propulsion, power is drawn from a storage battery and delivered to the propellers by electric motors. The heat engines employed for surface propulsion are also employed for charging the storage battery. In submarines propelled on the surface by the electric drive system, the heat engines are connected to electric generators and the power is delivered to the propellers through the same electric motors as are used for submerged propulsion. For such installations, it is necessary to provide a generating unit which is adapted to function efficiently both for surface propulsion and for charging the storage batteries.

In the furtherance of this objective, the present invention is directed generally to the provision of a prime mover of known high efficiency, such as an internal combustion engine, preferably of the Diesel type, which is structurally modified and adapted, as hereinafter described, to be coupled to an electric generator for driving the same, thereby forming a powerful and efficient generating unit.

This generating unit, as disclosed by the present invention, although it may be employed in other situations and for other purposes, is particularly well adapted for submarine electric drive propulsion because of its conformance with the limitations of space and design involved in submarine construction. The unit is so constructed as to provide the most advantageous use of the engine room space which it occupies, and has certain marked advantages in compactness of assembly, accessibility of the various mechanisms included in the unit, and embodies certain novel principles of cooling the generator and engine, and scavenging and/or supercharging the latter, which provide for efficient and economical operation of the unit.

A primary object of the present invention is to provide a light weight generating unit of minimum length which, by reason of the small engine room dimensions involved, and more particularly engine room length, is well adapted to the all-electric surface propulsion of submarines.

In the attainment of this and other objects, the important and essential feature of our invention resides in the construction of a combined engine-generator unit. We preferably superimpose the engine upon the generator in order to gain floor space and especially in order to minimize length. The engines may be of any preferred or desired type, that is, for example, two or four cycle, single or double acting and with any desired arrangement of cylinders and driving means between the reciprocating pistons and the power takeoff shaft. When the conventional form of engine is employed, utilizing a crank shaft as the power take-off shaft, the engines may be of the substantially vertical cylinder-in-line type or the so called V-type. While it is not essential that the engine power takeoff shaft be disposed directly above and in vertical alignment with the generator shaft for accomplishing certain advantages of our invention, nevertheless such an arrangement results in a generating unit well within the limits of submarine construction and in form suitable for the space devoted to such units in types of submarines to which such units are applicable. Also, with engines of conventional construction employing a crank shaft, the arrangement provides for disposing the head of the engine, where the major portion of the heat is generated, away from the generator, thereby facilitating efficient cooling of the latter. This, in conjunction with a structural arrangement that facilitates inspection and servicing of both the generator and the engine, provides a unit especially well adapted to the requirements called for in this type of structure.

The invention is not necessarily restricted to the specific form of electric generator shown, as the specific design of generators may be widely varied without departing from the main features of our invention. The invention is equally applicable to direct and alternating current generators.

The disposal of the generator shaft below and parallel to the power takeoff shaft of the engine permits of a certain flexibility of design of the two parts. Also, it permits the connection of the two shafts by gear ratios which may be suitably selected so that the generators may be driven at a speed higher than the speed of the prime mover shaft, and hence may be made more compact and lighter in weight.

Instead of gears, other forms of connections between the shafts, such as chains or multiple belt drives or the like, suitable for providing the desired drive ratio independently of the distance between the shafts, may be employed. This freedom of generator speed also simplifies the problem of positive ventilation of the generators, to be described later on.

Another important object of our invention is to provide simple and efficient means for controlling the temperature rise of the generator. In view of the substantially enclosed nature of the generator under, or at the base of the prime mover, the unavoidable development of heat by current flow ($I^2R$) presents an unavoidable problem of ventilating or cooling the generator. The medium normally used for such cooling is air. Under certain conditions of installation, the necessary supply of clean air at suitable temperature and dryness may be obtained from the atmosphere; under other conditions, it is necessary to use a closed circuit system whereby the cooling air, after passing through the generator, is cooled by being passed through a heat exchanger in thermo-contact with cooling water or the like.

As a means for obtaining this and other objects, the generator cooling devices and fluid passageways are combined, so far as possible, with the frame and corresponding structure of the vehicle and the frames of the power units.

A further object is to employ, if desired, the air which cools the generators for supporting combustion in the engine. The air may be delivered to the intake passageways of the engines at a pressure suitable for scavenging and/or supercharging the same. If desired, a positive draft of air through the generator may be maintained by the intake suction of the engine, thus eliminating or supplementing the use of blowers, fans, or the like.

Another important object of the invention is to reduce the weight of the power plant, associated parts and accessories, to a minimum. As a means of accomplishing this object and other objects, we employ, wherever possible, structural parts in a dual capacity for meeting the various structural and functional requirements of the power plant and the containing frame.

Illustrative features in this connection are the employment of the engine base as a housing for the generator and as a generator tunnel, utilizing the frame of the unit as oil storage and cooling space; the utilization of the lower plates of the supporting frame as a cradle for an angularly adjustable generator frame.

Other and incidental objects and advantages of the present invention will become more apparent from the following detailed description, and the appended claims.

Now, in order to acquaint those skilled in the art with the manner of constructing and operating an electric drive or propulsion device embodying our invention, we shall describe, in conjunction with the accompanying drawings, an embodiment of the invention.

In the drawings:

Figure 1 is a side elevational view, partly in section, of an embodiment of one phase of our invention in simple elementary form;

Figure 2 is a cross sectional view of the same, taken on line 2—2 of Figure 1;

Figure 3 is a perspective view of the device shown in Figures 1 and 2;

Figure 4 is a side view of a modified embodiment of the invention in which the engine is disposed above and offset laterally with respect to the generator, with parts of the generator housing broken away.

Figure 5 is a cross sectional view taken substantially on the line 5—5 of Figure 4;

Figure 6 is a side view, partly in section, of another embodiment;

Figure 9 is a side elevational view with the generator tunnel in section showing a modified arrangement of the engine-generator unit;

Figure 10 is a vertical longitudinal sectional view through a modified type of unit showing another manner of mounting the same;

Figure 11 is an end elevational view of a modified form of power unit embodying the invention;

Figure 12 is a longitudinal vertical section through the engine unit shown in Figure 11 taken substantially on the line 12—12 of the latter figure;

Figure 13 is a fragmentary cross-sectional view through the engine unit shown in Figure 12, illustrating the engine frame and crank case construction and showing also the mounting of the shiftable generator field in the generator tunnel;

Figure 14 is an end elevation of the opposite end of the engine unit shown in Figures 11 and 12;

Figure 15 is a side elevational view of an engine unit employing closed circuit cooling for the generator;

Figure 16 is an end elevation of the unit shown in Figure 15; and

Figure 17 is an end elevation of a modified type of unit employing closed circuit cooling for the generator.

Figure 7:
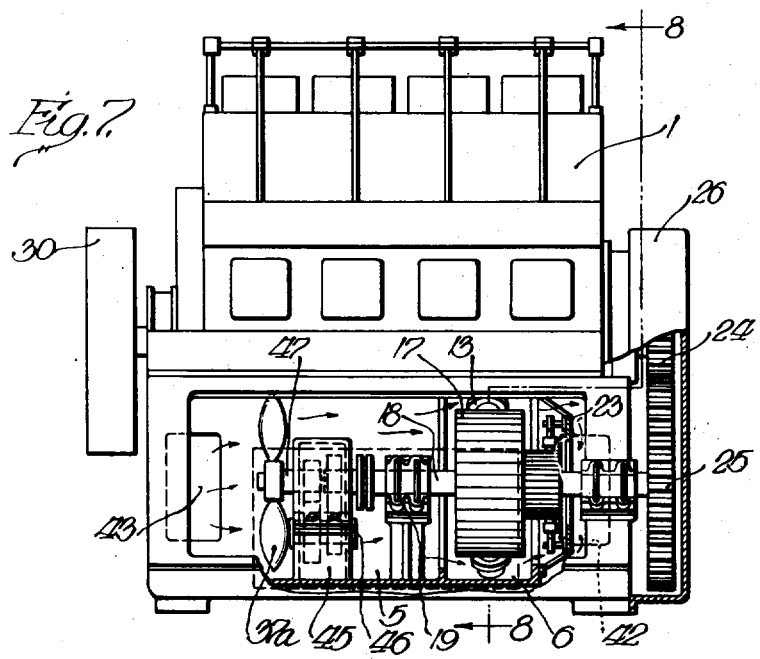
Figure 7 is a side elevation, with parts broken away, of another embodiment.

It is to be noted that there are a number of inescapable requirements which explain the character of certain features of the invention, in the form herein shown, which might otherwise be treated with greater freedom. For example, the greater length of crank shaft than generator shaft is largely due to the fact that for balanced engine operation four or more crank throws are employed to gain a substantially balanced engine. This results in a length of crank shaft which is greater than the necessary length of the generator shaft.

Also, in the preferred use of the invention, that is, for submarine propulsion or the like, the electrical system will preferably involve the use of direct current electrical apparatus and in submarine service will utilize storage batteries for undersurface operation. In the forms which have been illustrated, direct current generators are shown. In the system of submarine propulsion to which our present invention is preferably applied a storage battery of relatively large capacity is required, and in the preferred design we employ one or more groups of approximately 120 lead acid battery cells in series, giving a nominal voltage of approximately 240 volts. In order to charge the battery the generator must have a higher voltage, for example, 325 volts, and this controls to a large degree the character of the generator, for each generator is made with a voltage suitable to charge the storage battery. This explains, largely, the reason for certain proportions appearing in the embodiment we have selected to illustrate our invention. We wish it distinctly understood that while we have illustrated a construction of certain preferred forms, with certain working requirements in mind, in such installations as the workings required may be modified, the embodiments of the invention are to be freed from the limitations imposed by such requirements. Moreover within the same requirements, it is to be understood that modifications of our invention are contemplated. For example, in other adaptations, the electric generators may feed the current directly to electric driving motors, instead of to a storage battery or the like and hence the generators are driven whenever the vehicle is driven.

Referring first to Figures 1, 2, and 3, we have shown therein a prime mover 1 which is a four cylinder engine of the injection type, of known or preferred construction. This engine has a frame including the crank case 2 providing bearings for the crank shaft 3. The engine frame is supported upon a base 4, which base 4 constitutes a hollow frame providing a generator tunnel 5, in which there is disposed a generator 6.

We have herein illustrated the crank case 2 of the engine as having a longitudinally extending flange 7 at each side, these flanges in turn resting upon cooperating flanges 8 on the base frame 4, a depression in the upper part of the base frame at 9 providing clearance for the bottom of the crank case 2. Obviously, this manner of mounting the engine upon the hollow frame which constitutes the housing for the generator may be widely varied in detail, as will appear later. The base frame 4 is split horizontally into two main parts, 10 and 12, provided with suitable longitudinally extending flanges adapted to receive any suitable means for clamping the parts together. The frame of the generator which supports the field coils 13 may be made integral with the parts of the base frame 4, or it may be made of separate parts secured thereto. We have herein shown the upper half 14 of the generator frame as formed integral with the base portion 10, and the lower half of the generator frame as made of a separate member 15, provided with flanges 16, interposed between the flanges of the top and bottom portions 10 and 12, respectively, of the base frame 4.

The armature 17 of the generator 6 is mounted on a shaft 18 which has bearings 19 and 20 formed integrally or otherwise rigidly with the base frame portion 12. Suitable brush rigging 23 for the commutator 22 is mounted upon stationary parts of the frame 4. The crank shaft 3 and generator shaft 18 are geared together by a set of gears 24, 25, respectively, these gears being of any suitable character, such, for example, as spur gears or herring-bone gears, or may consist of a multiple V-belt drive, sprocket and chain, or any other preferred connection, which we broadly designate by the term "driving gear." The gear arrangement may be modified as by the interposition of an idler gear between the main gear and pinion, and the gear ratio is governed by the selection of the diameters of the gears, pulleys or sprockets, all as well known to those skilled in the art. By this parallel relation of prime mover shaft and generator shaft a compact unit of minimum axial length is provided, and the speed of the generator shaft may be suitably selected by design of the driving gear.

The gears 24 and 25 in this case are enclosed in a housing 26 which may be removable. This housing cooperates with a wall 27 at the end of the generator tunnel to provide a lubricant-tight chamber for the gears. The sides of the base section 10 are provided with inspection openings 28, as shown in Figures 2 and 3, said openings on each side being provided with removable doors permitting access to the interior of the generator tunnel.

Likewise, the end of the tunnel may be opened by removal of the door or cover 29. The frame 4 constitutes an extension of the engine frame to the foundation for the unit, and in this case the frame is arched over the generator or saddled upon the same by direct vertical superposition. The fly-wheel 30 of the engine is disposed at the opposite end of the crank shaft 3 from the gear 24.

In Figures 4 and 5 we have illustrated an embodiment in which the generator is disposed at the base of the engine, but at one side of the same. The base 4a supports the engine 1 in a manner substantially as above described in connection with Figures 1, 2, and 3, but the generator and its cover are disposed at one side of the base 4a. This base has a semi-cylindrical portion 32 adapted to receive the bottom half 33 of the generator frame, and the top half 34 of the generator frame is extended to form a semi-cylindrical flanged cover for the generator tunnel. The joint between the cover 34 of the base portion 32 is disposed in a plane which is at substantially 45 degrees from the vertical, the bottom portion of the frame providing bearings 35 and 36 which are shown as provided with notches covered over by the top section 34 when it is in place. The shafts 3 and 18 are connected together by suitable driving gears such as the gears 24 and 25, covered by a suitable housing 26a. Whereas, in the form shown in Figures 1, 2, and 3, in order to remove the armature of the generator it is necessary to lift off the engine 1 and raise the top section 10 of the base 4, in the arrangement shown in Figures 4 and 5 the engine may remain on the base 4a and access can be had to the generator armature merely by lifting the top section 34, which constitutes the top of the generator frame and a cover for the generator tunnel 5. The width of the unit shown in Figures 4 and 5 is greater than that shown in Figures 1, 2, and 3, but its height is less, and it may be used in situations where less head room is available than would be required for a unit of the type shown in Figures 1, 2, and 3.

Since the generator is heated by the passage of current therethrough ($I^2R$ loss), and is completely enclosed, it would tend to overheat if operated at any considerable load. Ventilating and cooling is necessarily resorted to in order to carry off the heat, and serves also to dispose of such particles as copper, carbon, or the like which result from wear at the commutator of the generator. Our construction is well adapted to this purpose, since the generator tunnel provides room for a blower, and also, if desired, provides room for a heat exchange device, or cooler, as shown in Figure 6.

We provide two methods of cooling the generator, which two methods may be employed together or separately. The first is the employment of the engine suction to move air through the generator and the second is to employ a blower driven by the engine or other motor to force air through the generator. The air forced by a fan or blower may be moved in a closed circuit through a cooler or, may be driven through an open circuit.

The embodiment shown in Figure 6 provides a closed cooling circuit for air. In this case a cooler 37, consisting preferably of a drum-shaped cooler, through which water is circulated, with air conducting tubes extending between the heads of the drum for the passageway of the air to be cooled, is provided. Such a drum-shaped cooler or heat exchanger may be supplied with water from the tender of a locomotive, or in a marine vehicle by any convenient pump and connections (not shown) known in the art.

The generator shaft 18 is provided with a blower, in this case shown as a fan 37a, for compelling the circulation of air through the cooler 37, and thence through the generator 6; thence upwardly through openings indicated at 38—38 on each side of the vertical plane of the top section 14 of the generator tunnel.

Similar openings may be provided leading to the space 9 between the engine crank shaft and the base 4, the air driven generator and through the openings 38—38, then through the longitudinal passageways 39—39, shown in Figure 2, and back into the generator tunnel through opening 40 at the forward end of the cooler 37. Thus a closed circuit for the flow of cooling and ventilating air is provided.

Figure 8:
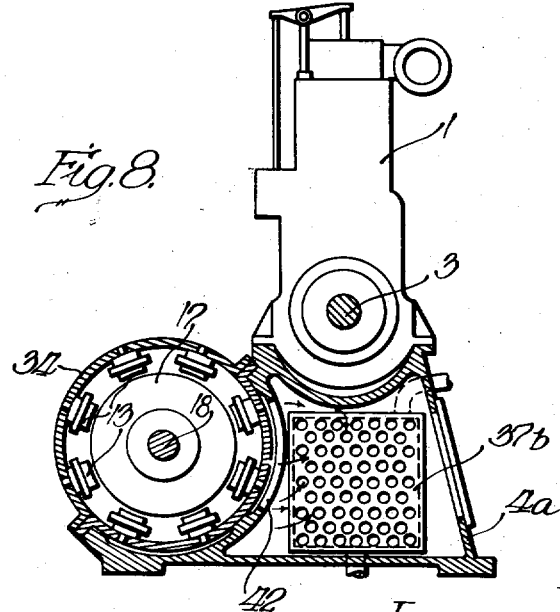
Figure 8 is a vertical section taken on the line 8—8 of Figure 7.

In the form shown in Figures 7 and 8, the cooler 37b has been set in the base 4a and the fan or blower 37a is driven at a higher speed than the generator shaft 18 through the step-up gear 45, which is disposed in the generator tunnel 5, the bearing 19 in this case being moved closer to the generator 6 and the step-up gear 45 having a casing or housing forming a support for the gears contained therein. The step-up gear shown comprises a large gear on the generator shaft driving a pinion on the idler shaft 46, the idler shaft having a gear driving a pinion on the blower shaft 47. Obviously, instead of this spur gear form of step-up, an epicyclic or concentric type of step-up gear may be employed, or any other form of step-up gear suitable for the purpose may be utilized. The fan, or blower 37a, may move the air through the generator 6 through an opening in the side wall such as 42, through the cooler 37b, and back into the generator tunnel through the opening 43. The direction of air movement is not important. This arrangement provides a closed air circuit for cooling the generator.

It is to be understood that a fan and a heat exchanger, such as the exchanger 37b disclosed in connection with Figure 8, may be employed in the generator tunnel 5 of Figures 4 and 5, in the space between bearing 36 and the generator 17. This constitutes a construction substantially similar to that shown in Figure 6, except that in Figure 6 the generator is disposed below and at the side of the engine 1. Also whereas Figure 6 shows a closed air circuit, Figure 4 indicates an open circuit. In Figures 7 and 8, the cooler 37b may be disposed in the generator tunnel, instead of below the base of the engine 1, if desired.

The cooling and ventilating of the generator may be done with an open circuit cooling flow, or a closed circuit, as previously described, and we therefore do not intend to be limited to the specific closed circuit type of cooling herein disclosed. Also the air may be moved through the generator in whole or in part by the engine suction. Even if the engine be scavenged and supercharged under a pressure above atmosphere, nevertheless the engine suction—i. e., the displacement of the piston in the cylinder—assists in moving the air through the generator.

In Figure 9 we have shown an embodiment in which the cooling air, after it passes through the generator, is delivered into the intake passageways of the engine for supercharging and scavenging. The engine which is here shown is of the injection type, for example a Diesel engine. It has an air header 48, one end of which is connected through valve 48a to the supercharging air connection 49, which connection communicates with the interior of the generator tunnel through an opening 50 formed in the top section 14 of the generator tunnel. The opposite end of the header 48 is controlled by a valve 52. By closing off the valve 48a and opening the valve 52, air is drawn at atmospheric pressure into the intake passageways of the engine. The generator tunnel may communicate through a valve 53 with an outlet pipe 54 for discharging the ventilating and cooling air after its contact with the generator to some other point if it is not desired to deliver it to the intake passageway of the engine. The inlet end of the generator has a revolving adjustable shutter or register 55 through which air is drawn into the tunnel by the fan or blower 37a. It is to be observed that the fan or blower 37a is illustrated more or less diagrammatically and its specific form may be widely varied to suit conditions, or the particular design desired. The shutter 55 has openings 58 adapted to cooperate with spaced openings in the end of the tunnel, and is adjustable by means of the worm gear 56 operated by the control shaft 57, which worm engages a portion of the geared periphery 55' of the shutter to rotate the shutter into position with respect to the slotted end of the tunnel. In this manner, any desired quantity of air may be admitted to the tunnel.

Considering now Figure 10, this embodiment shows another method of mounting the engine and cooperating generator, when it is desired to conserve headroom, the generator in this case being mounted below the floor level of the vehicle in which the unit is to be used.

In this embodiment, an engine indicated at 1, which has an intake manifold indicated by the numeral 48, corresponding to the intake manifold 48 of Figure 9, is disposed in a recessed portion 82 of a floor 83 of a vehicle, such as a locomotive, submarine or the like. The fly-wheel 30 of the engine is shown as disposed in this recess, and an integral part of the floor, or an upwardly extending flanged portion 84, is adapted to form a housing for the gear 24 carried by the crank shaft of the engine, and the gear 25 which is secured to the generator shaft 18.

The generator unit is shown as mounted below the engine housing, the shaft 18 being supported upon suitable bearings, such as 86, the generator itself being indicated by the reference numeral 6. A step-up gear 87 is provided between the shaft 18 of the generator and the shaft 88 which is connected to the impeller blower 89. This shaft is supported upon bearing 85. The step-up gear serves to increase the speed of revolution of the shaft 88 with respect to the shaft 18, to provide an induced draft through the impeller 89. Thus, air drawn through the inlet opening 90 of the generator tunnel 5 is forced past the generator to cool the same, and upwardly through the impeller 89 into the chamber 92 and thence through the conduit 93 to the intake manifold 48 of the engine.

However, if desired, the impeller or blower 89 could be omitted, and the suction produced by the engine 1 could be employed to draw air through the inlet opening 90 and upwardly through the conduit 93 to the intake manifold 48 of the engine, thus providing a method of cooling the generator unit and at the same time supplying the necessary air through the generator to the engine, if generator capacity and compactness of design are not essential.

It will be noted that the entire generator unit, as well as the lower or crank case portion of the engine 1, is disposed below the floor level 83 of the vehicle, thus providing a unitary structure requiring little or no headroom, which may be desirable in certain types of vehicles. If desired, the end of the generator tunnel which encloses the impeller 89 might be left open, and provided with a screened closure member in the movement of the vehicle could result in a forced draft of air past the generator, which might then be connected through suitable connections, (not shown) to the intake manifold 48 of the engine, thus the motion of the vehicle cooperating with the suction of the engine to provide a draft of cooling air past the generator.

Considering now the embodiment of the invention disclosed in Figures 11, 12, 13, and 14, we have herein disclosed a V-type of engine, which may be either an internal combustion engine or an injection engine of the Diesel type. This engine is indicated by the reference numeral 70. This engine is provided with a circular plate 45' which forms the bottom wall of the engine base frame corresponding to the frame 4, as shown in the earlier embodiment, which is disposed interiorly of the outer defining walls 110 and 112.

The horizontal transverse frame plate 61 for the engine has a semi-cylindrical groove or depression 62, forming the lower half of the generator tunnel 5 for the unit. Transverse vertical frame plates 103 and 104 at the ends of the groove or depression 62 form bulkheads defining oil storage or other liquid storage chambers.

The upper half of the generator tunnel 5 is formed, as shown more in detail in Figure 13, by a circular plate 45', which forms the bottom wall of the engine base frame corresponding to the frame 4, as shown in the earlier embodiment. The engine base frame here designated is built up of the semi-cylindrical shell or wall 45' and outer walls 110, 112, between which are provided stiffening frames, such as 113 and 114. A longitudinally extending wall 115 at the right of Figure 13 is joined at its lower end to the semi-cylindrical wall 45', and at its upper end to the wall 112, the juncture forming a flange 116 to which the flange 117 of the upper half of the crank case of the engine is secured.

This wall 115 is preferably imperforate. A similar wall 115 upon the opposite side is joined at its upper end to the outer wall 110 to provide a second bolting flange 116. This wall 115 is preferably also imperforate. Oil from the engine crank case is preferably withdrawn by a pump (not shown) and is discharged into the chamber 119, this space serving as an oil reservoir for the engine. The opposite side of the engine base may be similarly utilized. An oil cooler 120 forming a heat exchanger between the oil and the jacket water of the engine is disposed in the chamber 119. This regulates the temperature of the oil.

It is to be observed that the generator is of considerable less length axially than is the engine, and the ventilating tunnel which is formed in part by the concaved extension of the crank case of the engine is exposed to the current of air circulated through the generator. The cooling and ventilating current of air which maintains the temperature of the generator at a suitable value is capable, at the same time, of carrying off excess heat in the crank case. This is a feature of considerable value, as a fairly extensive surface of the body of lubricating oil is exposed to the cooling current of air in the generator housing and tunnel.

The opposite side of the saddle-shaped frame may likewise be employed for oil storage and temperature control, if so desired. An inspection opening 122 is formed through the right hand side as viewed in Figure 13, this opening having a suitable cover 123 removable to permit inspection of the commutator armature and field windings of the generator 6. A similar inspection opening, with removable cover is provided for access to the rear bearing 20 and the step-up gear 45, as shown in Figures 11 and 14. The generator has a cylindrical steel frame 124, which is supported on anti-friction bearings or rollers 125—125, mounted on a semi-cylindrical wall 62 to permit the frame to be turned angularly, as by means of a worm and gear (not shown) and to be locked in position for normal operation.

The brush rigging is not shown in Figure 12, but it will be understood that it may be mounted rigid with the field frame 124, or otherwise disposed in suitable position to cooperate with the commutator 22, and may be adjusted rotarily for inspection and service as the field frame is turned.

The bearings 19 and 20 are provided by suitable pedestals 126 and 127, which fit in the groove or depression in frame 61. These pedestals are supported upon the cylindrical shell 62, which in turn is supported by the transverse vertical frames, such as 103 and 104.

The step-up gear 45 is disposed between the bearing 20 and the adjacent end of the tunnel 5 to bring the shaft of the blower 65 into axial alignment with the armature shaft 18, that is, substantially concentric with the cylinder tunnel 5. The housing 66 of the blower 65 is mounted upon a tubular neck 67, the end thereof telescoping into and being connected to the end of the tunnel 5. The housing of the blower 65 has a tangential discharge connection 68 which communicates with the pipe 69, this pipe in turn being connected to a super-charge air header leading to the intake openings of the respective cylinders of the engine.

The engine herein shown is illustrated as of the 8-cylinder Diesel type, although this is optional. The super-charge air header 48 communicates by two branches with the two sets of engine cylinders of each engine, each blower being individual to its engine.

At the air intake end of the tunnel 5 we provide a valve in the form of an air register, comprising a slotted plate 71, with which a movable slotted plate 72 cooperates, the movable plate 72 being provided with actuating means similar to those shown in connection with Figure 9, comprising a worm which is operated by a hand wheel disposed outwardly of the unit. The plate 71 is disposed back of the bearing 19, and in advance of the generator 6. Its purpose is to control the flow of air through the generator and to control the rate of super-charging.

The air used for cooling the generator of the present invention may be circulated through the generator tunnel by means of the blower 65, which may be supplemented by engine suction, if desired. For example, in Figure 12, the blower 65, supplemented by engine suction effective through the super-charging header and manifold 69, will induce a draft of air through the cooperating openings in places 71 and 72, past the generator 6, which air at the same time comes into contact with the undersurface of the crankcase of the engine. Since engine suction alone is not feasible to effect this circulation of air, except in units where compactness of design and large generator capacity are not essential, the blower 65 serves the dual purpose of providing a flow of cooling air past the generator and the external surface of the crank case, to control the temperature thereof, and also provides a supercharging or scavenging air flow to the cylinders of the engine, together with or in addition to the air normally supplied thereto. This method of controlling the temperature of an enclosed engine generator unit is, we believe, broadly new.

The engine has at the air intake end of the tunnel 5 a gear 24 which meshes with a suitable idler, and the idler in turn meshes with the generator pinion 25. A suitable gear case 78 forms a closed housing for the gear, the idler and the pinion, a portion of the same being shown in Figure 12. This gear case is adapted to contain a quantity of lubricant.

An oil pump 140 driven from the end of the crank shaft of the engine draws oil by way of the pipe 142 from the sump 119 formed in the hollow base of the engine frame and discharges the same through the oil filter 143 and pipe 144 into the lubricating oil cooler 120. From thence the oil is distributed to the bearings of the engine. The jacket water is drawn from the engine jacket by the manifold pipe 145 from each side of the engine into the intake 146 of the jacket water pump 59. A standpipe 147 leads to an overhead make-up water tank 148, disposed at a suitable height above the engine. The discharge of the jacket water circulating pump 59 is by way of a pipe 149 which leads to the top of the heat exchanger 130. From the bottom of the same, pipe 150 conveys the jacket water into and through the tubes of the lubricating oil cooler 120, the delivery of the jacket water from the cooler 120 being by way of pipe 152 and branches 153 and 154 leading to the opposite sides of the engine for cooling the jacket.

A second water circulating pump 131 which has its intake connected to a suitable source of water supply, discharges water through the pipe 155 to the top of the heat exchanger 130, water passing down through the tubes of the heat exchanger and returning again to the top, and being discharged through the pipe 156 which leads, at the opposite end of the engine, to the jacket of the exhaust pipe. The two exhaust pipes from the two sets of cylinders of the engine are manifolded together as will be described later. In Figure 11 we have shown the pipes 157 leading to the exhaust manifolds 158 disposed on each side of the engine, and we have also illustrated the pipe 145 as being directed toward the intake manifold 159 of the engine.

Figures 15 to 17, inclusive, illustrate a modified embodiment of our invention in which the cooling circuit for the generator is a closed circuit, air being moved through the generator and through a heat exchange device, as disclosed in Figures 6 to 8. The heat exchange device is cooled by water from the circulating pump, such as the pump 131 heretofore described. The air supply arrangement is modified in that the air for supercharging and scavenging is provided by an individual blower taking the air preferably from below a supporting deck structure or the like, when the invention is embodied in a submarine application, through a high speed blower driven from the crank shaft of the engine. The arrangement for cooling the jacket water through a heat exchange device fed from the circulating pump 131 is substantially the same as described in the immediately preceding embodiment. The circulation of jacket water and the circulation of lubricating oil and cooling of the same is substantially identical with the preceding embodiment. The engine is disposed above the main personnel deck of a submarine, or of a marine vehicle, and the generator is disposed therebelow. The crank shaft of the engine is preferably, but not necessarily, on the plane of the longitudinal axis of the vehicle. The drive of the shaft of the generator 6 through suitable gears such as illustrated in Figure 12 is the same in the present embodiment as that in the preceding embodiment. Upon the end of the generator shaft 18, at the right as viewed in Figure 15, a cooling fan or centrifugal blower 190, with a suitable blower casing, is mounted in a chamber 191. The end wall of the chamber has a pair of heat exchange devices 192 and 193 placed one behind the other and across the air passageway, the heat exchange devices being cooled by water from the pump 131 through the pipe 194 and branch pipes 195 and 196. The branch pipes have suitable valves therein to control or shut off the flow to the respective heat exchange devices 192 and 193, respectively. These branch pipes lead to the bottom of the heat exchange devices, and the upper ends of the heat exchange devices are connected by outlet pipes 197 and 198, respectively, to the branches 199 and 200 of the exhaust manifolds 158. Suitable valves are provided in these outlet pipes for control of flow therethrough.

The air which is forced through the heat exchange devices 192 and 193 by the fan 190 enters an outlet nozzle 202 at the end of the generator, and this outlet nozzle is connected by a conduit 203 leading back to the opposite end of the generator housing where a diagonally arranged elbow 204 opens into the generator housing between the outer shell 62 of the same and the gear box 78. The fan 190 is preferably a multi-vane blower having a suitable volute casing as indicated in dotted lines at 206 in Figure 16. Obviously, any suitable fan or blower may be employed. The cooling water discharged by the pump 131 through the corresponding heat exchange devices is also led through a pipe corresponding to pipe 157 to the exhaust manifold of the engine. Obviously, if desired, other disposition may be made of cooling water from either the heat exchange devices 192, 193, which cool the air circulating thru the generator 6, or of the cooling water from the heat exchange device, such as 130, which cools the jacket water of the engine. It may, for example, be discharged other than through the exhaust pipe jackets or the exhaust pipe. The heat exchange devices 192, 193 may be of any suitable type, preferably being of the fin and tube type, however, to provide a large superficial area for engagement with the circulating air for cooling the generator. The heat exchange device is arranged in two sections for safety and convenience of repair. In Figure 15 I have shown a source of water supply controlled by the valve 160 for supplying water to the pipe 131.

The air intake for the engine unit is through an individual connection and a blower, taking air from below the deck or floor level 161 and delivering the same to the intake passageway of the engine. Standpipes or louvres 162, communicating at their upper ends at points well above the bottom of the upper chamber are disposed in the engine space, leading to the space below the floor 161, which space forms an intake chamber, substantially at atmospheric pressure or slightly below the same, for the engine. Referring particularly to Figure 16, the intake for the engine 70 shown therein comprises an elbow fitting 219 communicating at its lower end vertically with an opening through the deck 161, and at its other end, horizontally with the intake of a high speed blower 220, which blower is driven at a speed above that of the crank shaft through suitable gears not shown. A volute casing 222, within which the blower 220 is contained, has a delivery pipe 223 leading to the intake manifold of the engine. The blower 220 is preferably a multi-vane type blower, and the arrangement shown confines the noise of the same chiefly below the floor 161.

Considering the embodiment of the invention disclosed in Figure 17, a closed type of air cooling system for the generator tunnel is herein provided, which, however, has the heat exchange device 224 disposed outside of the tunnel of the housing, and connected thereto by a volute elbow 225 and a second elbow 226 leading into the heat exchanging device 224. Suitable inlet and outlet connections indicated at 227 and 228, respectively, provide for circulation of cooling medium to the heat exchange device 224. In its other respects, this embodiment is similar to the embodiment shown in Figure 16, and a detailed description thereof is not believed warranted.

It should be noted, in connection with the embodiment of Figures 15 and 16, that the generator base is supported upon suitable framework, which is provided with openings 164 and 165, which are adapted to be removed to provide for access to the underside of the generator housing.

It is also apparent, in this embodiment, that the circulation of air through the generator tunnel may be such that a portion of the air is bypassed into the inlet opening 219 for passing some of this air to the intake manifold of the engine for supercharging or scavenging of the same. Also, an open air circuit may be provided in the same manner.

We are aware that many changes and modifications, both in structure and in operating requirements, may be made, involving departures from the preferred embodiments of the invention herein disclosed, and we therefore do not intend to limit ourselves to the exact details shown and described herein, but only in so far as limited by the scope and spirit of the appended claims.

We claim:

1. In a device of the class described, an internal combustion engine having a power take-off shaft and a working cylinder, an electric generator having a rotor shaft parallel to the take-off shaft, driving connections between the take-off shaft and rotor shaft, said generator having a stator structure surrounding the rotor shaft and a frame member enclosing the generator and having a portion thereof extending upwardly for supporting the engine above the generator, the working cylinder being disposed on the side of the take-off shaft opposite that of the rotor shaft.

2. In combination, a vertical internal combustion engine having cylinders, a single crank case and a crank shaft below said cylinders, a generator below the crank case having a rotor shaft parallel to the crank shaft, and having a stator, a frame forming an enclosing housing for the generator providing bearings for the rotor shaft and constituting a rigid extension of the crank case of the engine, a driving gear between said shafts and a closed housing for said gear supported on said frame, said frame being divided on a plane extending substantially through the axis of the rotor shaft.

3. In combination, an internal combustion engine having a crank shaft, a crank case therefor and cylinders disposed substantially vertically above the crank shaft, a hollow frame connected to said crank case for supporting said engine, said frame forming a generator housing and ventilating tunnel beneath said engine and within the axial extent of said crank shaft, a generator disposed in said housing, said generator having a rotor shaft, bearings on said frame for the rotor shaft, a driving connection between said shafts, an air cooler, and air impelling means within said tunnel driven from said generator shaft for moving air through the tunnel to cool the generator, said means including a blower operated from the generator shaft for circulating air in substantially a closed circuit through said cooler and said generator.

4. In combination, an internal combustion engine having a crank shaft and a crank case therefor, a hollow frame disposed beneath and engaging said crank case for supporting said engine, said frame forming a closed generator housing, a generator disposed in said housing, said generator having a rotor shaft bearing on said frame for the rotor shaft, a driving connection between said shafts, and air impelling means within said housing driven from said generator shaft for moving air through the housing to cool the generator, said engine having an intake passageway including a blower for causing air to flow through the generator to cool and ventilate the same, and means for conducting the air from said generator into the intake passageway of the engine.

5. In combination, an internal combustion engine having a power take-off shaft, a housing therefor, a hollow frame forming an extension of the housing and constituting a generator housing and air tunnel disposed in parallel vertical alinement beneath said housing, a generator disposed in said generator housing and having a rotor shaft driven by said engine shaft, an air cooler disposed in said hollow frame, and means for circulating air through said air cooler and generator.

6. In combination, an internal combustion engine having a crank shaft, a hollow base frame for supporting said engine in elevated position, said base frame comprising a generator housing and an air tunnel, a generator in said housing, said generator having a shaft driven by the crank shaft, an air cooler disposed in said housing endwise of the generator, said housing and tunnel providing a closed circulation for air through the cooler and the generator, a blower driven from the generator shaft for circulating air in said circuit, and a step-up gear disposed in said housing for driving said blower from the generator shaft.

7. In combination, an internal combustion engine having a crank shaft and an engine frame, a hollow base frame for supporting said engine frame in elevated position, said base frame providing a generator housing, a generator in said housing, said base frame also providing an air cooler housing, an air cooler in said housing, said cooler and generator being disposed side by side below the engine and having air conduits for providing a closed circulation, said generator having a shaft driven by the crank shaft, a step-up gear disposed within said air conduit and a blower operated by said gear and forcing the air through said circuit.

8. In combination, a tubular generator tunnel, an internal combustion injection engine superposed on said generator tunnel, a power take-off shaft for the engine extending longitudinally of the tunnel, a generator in the tunnel, said generator comprising a stator structure adjustably mounted in said tunnel and a rotor structure having a shaft, bearings in the tunnel for said shaft, said bearings being at the intake end and at a point intermediate of the ends respectively of the tunnel, a step-up gear between the second bearing and the discharge end of the tunnel, and a blower having its intake at the discharge end of the tunnel, said blower having a shaft driven by said generator shaft through said step-up gear and having a discharge connection communicating with the engine for delivering to the intake of the engine the air drawn through the generator tunnel.

9. In combination, a tubular generator tunnel, a generator therein, a prime mover disposed above said generator comprising an internal combustion engine having a saddle shaped depending power shaft housing forming a part of the generator tunnel, said generator and prime mover having parallel vertically spaced shafts, a driving connection between said shafts disposed at one end of the tunnel and a blower driven by one of said shafts disposed at and communicating with the other end of the tunnel for moving cooling air through the tunnel in contact with the generator and the crank case, said generator tunnel being divided on a substantially horizontal plane passing substantially through the axis of the generator shaft.

10. In combination, an engine-generator unit having an engine provided with a substantially horizontal shaft, a generator having a substantially horizontal shaft adjacent to and below the engine shaft, a driving connection between said shafts, a frame for the engine and a frame for the generator, said frames being connected together, a tunnel for the generator, said generator having an armature shaft, a blower connected to said armature shaft, a conduit leading from one end of the generator tunnel to the other, a heat exchange device for cooling the air propelled by the blower through the conduit, a pump for circulating water through the engine jacket, a heat exchange device for the engine jacket water, and a circulating pump for pumping water through both of said heat exchange devices.

11. In an engine-generator unit the combination of a vertical multi-cylinder engine having a horizontal crank shaft, a generator having a rotor shaft parallel with and below the crank shaft, a hollow frame for supporting the engine above the generator and for supporting the generator, said frame being divided longitudinally on substantially the plane of the rotor shaft to permit removal of the rotor shaft in a direction lateral to its axis, said hollow frame providing a generator housing and ventilating tunnel extending the full length of the engine, a blower for moving air through said tunnel to ventilate the generator, and a heat exchanger disposed transversely across the bore of said tunnel for cooling the circulating air which ventilates the generator.

12. In combination, a vertical internal combustion engine having a horizontal crank shaft and a depending crank case, a generator having a horizontal rotor shaft, and a frame disposed about said generator and having means engaging the depending crank case of the internal combustion engine for supporting said engine above the generator, said frame having a passageway therethrough forming a generator housing and ventilating tunnel, said generator being disposed in said ventilating tunnel.

13. In combination, an internal combustion engine having cylinders and a substantially horizontal power take-off shaft, a generator having a substantially horizontal rotor shaft disposed below the power shaft, and a hollow frame supporting the engine above the generator and forming a generator housing and ventilating tunnel, said generator being disposed in said housing, the engine cylinder, power shaft and rotor shaft being disposed substantially in vertical alignment, and the frame being parted longitudinally to permit removal of the power shaft and of the generator shaft each laterally with respect to its longitudinal axis.

14. In a device of the class described the combination of a multi-cylinder internal combustion engine having a single crank shaft, a generator of less axial length than the crank shaft, said generator having a stator frame, a rotor and a rotor shaft disposed parallel to the crank shaft, means providing an enclosing housing and ventilating tunnel for said generator, said means comprising an intermediate frame having at its upper end a downwardly concaved recess for receiving the engine crank shaft and serving as a crank case, and at its lower end an upwardly concaved recess forming the upper part of the generator housing and ventilating tunnel, a base member cooperating with said intermediate frame, said base member having a downwardly concaved recess forming the lower part of the generator housing and ventilating tunnel, said generator being enclosed within the generator housing and ventilating tunnel, and means for forcing air through the ventilating tunnel to cool the generator and to cool the engine crank case.

15. In combination, a plate having a trough formed therein, a vertical internal combustion engine having a crank shaft, a crank case for the engine, said crank case having a depending hollow arched extension disposed over said trough and forming therewith a generator tunnel, a generator disposed in said tunnel, said generator having a shaft disposed below and driven by the crank shaft and having a frame supported in said tunnel, said hollow arched extension of the crank case providing a sump for lubricating oil for the engine.

16. In combination, an internal combustion engine having a crank shaft, an electric generator having a rotor shaft disposed parallel to and at one side of said crank shaft, a hollow structural support for said engine having an inclined trough-like portion, means in said trough-like portion for supporting said generator and rotor shaft, driving connections between said shafts, and a complementary housing fitting over and detachably secured to said trough-like portion and forming an enclosing air tunnel for said generator and rotor shaft.

17. In combination, an internal combustion engine having a horizontally extending crank case, means for supporting said engine including a semi-cylindrical upwardly concaved trough-like member and a downwardly concaved complementary trough-like member forming a substantially cylindrical horizontally extending air tunnel, a rotor shaft disposed in said tunnel, a generator mounted on said shaft, a field frame for said generator mounted in and secured to said tunnel-forming members, and brush rigging for the commutator of said generator secured to said tunnel forming members.

18. In combination, an internal combustion engine having a horizontally extending crank case, means for supporting said engine including a semi-cylindrical upwardly concaved trough-like member and a downwardly concaved complementary trough-like member forming a substantially cylindrical horizontally extending air tunnel, a rotor shaft disposed in said tunnel, a generator having a rotor mounted on said shaft, and a field frame for said generator rotatably mounted on said latter trough-like member.

19. In combination, a transverse air trunk, means defining a generator tunnel communicating with said air trunk, an internal combustion engine mounted on said tunnel defining means, a generator in the tunnel having a rotor shaft, said engine having a driving shaft geared to said rotor shaft, a jacket water circulating pump for the engine, a heat exchanger connected to said pump and mounted in said air trunk, and a cooling water pump driven by the engine for supplying cooling water to the heat exchanger.

20. In combination, a transverse air trunk, means forming a generator tunnel communicating with said air trunk, an internal combustion engine mounted on and spaced above said tunnel forming means, a generator in said tunnel having a rotor shaft, said engine having a driving shaft geared to said rotor shaft, a jacket water circulating pump for the engine, a heat exchanger connected to said pump and mounted in said air trunk, and a cooling water pump driven by the engine for supplying cooling water to the heat exchanger, said last-named pump being disposed above said air trunk, said engine having a depending hollow frame saddled on the tunnel forming means, said frame comprising a sump for lubricating oil, and an oil cooler for said sump, said oil cooler being connected with the jacket water circulating pump of the engine.

21. In combination, a vertical internal combustion engine having a crank shaft and having a saddle-shaped frame forming the upper half of a generator tunnel, a trough-shaped plate forming the lower half of the generator tunnel, a generator in the tunnel, a shaft for the generator, gears connecting the two shafts at one end of the tunnel, a heat exchange device across the other end of the tunnel, and a blower driven by the generator shaft and being disposed within the tunnel and serving to move cooling air through the generator and heat exchange device.

22. In combination, an engine, a depending extension on said engine defining a semi-cylindrical inverted trough, a semi-cylindrical trough-like member secured to said extension to form a cylindrical tunnel beneath said engine, generator means in said tunnel geared to said engine, a pair of spaced vertically extending supporting members engaging said extension and trough-like member for supporting said engine, means in said tunnel for drawing air therethrough, and air-conduit means disposed exteriorly of said tunnel between said supporting members and connected to opposite ends of said tunnel.

23. In combination, an internal combustion engine having a crank shaft, a crank case therefor including a pair of outwardly and downwardly arched hollow extensions defining a semi-cylindrical inverted trough below said crank case, a semi-cylindrical trough-like member having lateral flanges at the edges thereof engaging the depending ends of said extensions for supporting said engine in position, one of said extensions comprising an oil sump, a generator mounted in the tunnel formed by said trough-like member and said crank case, means for blowing air through said tunnel, means for controlling the temperature of said air, means in said sump for controlling the temperature of the oil in said sump, and means common to both said controlling means for removing absorbed heat therefrom.

24. In combination, an internal combustion engine having a horizontal crank shaft, a crank case surrounding said shaft, a hollow upwardly-concaved extension depending from said crank case, a downwardly-concaved trough-like member defining with said extension a cylindrical tunnel beneath said engine, a generator shaft mounted axially in said tunnel and geared at one end to said crank shaft, a stator frame mounted in said tunnel, means in said tunnel providing for rotation of said stator frame, said extension having an inspection opening extending through one side thereof and providing access to said stator frame, and closure means engaging said extension about said opening.

25. In combination, an engine, a crank case therefor, a pair of hollow arched leg portions depending from said crank case and defining with the bottom of said crank case a semi-cylindrical inverted trough, a semi-cylindrical trough-like member having means engaging the depending ends of said leg portions for supporting said engine in superposed position thereon and defining with said leg portions and crank case a cylindrical tunnel beneath said engine, and a generator rotor shaft geared to said engine and supported axially in said tunnel.

26. In combination, an engine having a crank case housing open at the bottom, means for closing said housing including a pair of hollow arched depending legs, means engaging the ends of said legs and including an intermediate downwardly-concaved trough-like portion for supporting said engine, said closing means and said supporting means defining a substantially cylindrical tunnel beneath said engine, a shaft supported axially of said tunnel and geared to said engine for rotation, a generator within said tunnel mounted on said shaft, and means carried by said shaft for drawing air through said tunnel in contact with said closing means.

27. In combination, a floor member, an internal combustion engine extending above said floor member, a transverse air trunk below said floor member, a generator tunnel below said floor member and including a generator shaft geared to said engine and having a generator mounted thereon, blower means geared to said generator shaft, means for admitting air from above said floor member into said tunnel, said blower means drawing air through said tunnel and discharging said air into said air trunk, and air intake means for said engine adapted to draw air from said air trunk.

28. In combination, an engine having exhaust jackets, a crank case for said engine including an integrally formed depending oil sump, water circulating pump means for circulating cooling water through said jackets and said sump, a cylindrical generator tunnel below said crank case, a generator mounted for rotation within said tunnel, means for drawing cooling air through said tunnel, means for controlling the temperature of said air, and means common to said controlling means and said pump means for removing absorbed heat therefrom.

29. In combination, an engine having exhaust jackets, a crank case for said engine including an integrally formed depending oil sump, water circulating pump means for circulating cooling water through said jackets and said sump, a cylindrical generator tunnel below said crank case, said crank case and sump forming a portion of the interior wall of said tunnel, a generator mounted for rotation within said tunnel, means for drawing cooling air through said tunnel in contact with said interior wall, means for controlling the temperature of said air, and means common to said controlling means and said pump means for removing absorbed heat therefrom.

LAWRENCE Y. SPEAR.
HUGO E. GRIESHABER.
ERNEST NIBBS.